Patented Feb. 10, 1948

2,435,750

UNITED STATES PATENT OFFICE 2,435,750

PROCESS FOR PREPARING PHOSPHORILATED THIAMIN

Ben Maizel and Irving Gerson, Chicago, Ill., assignors to Vico Products Company, Chicago, Ill.

No Drawing. Application July 7, 1945, Serial No. 603,750

8 Claims. (Cl. 260—251)

Our invention relates to the production of phosphorilated thiamin and is particularly concerned with improved methods for the production of co-carboxylase, the term "co-carboxylase" being used generically to include the product in its normal form, that is, as the hydrochloride, or in the form of the corresponding base, that is, in which the hydrochloric acid is not present or has been split off.

The synthesis of co-carboxylase or co-carboxylase concentrates has heretofore been known, one well known method comprising, in general, reacting a vitamin $B_1$ or thiamin salt, such as thiamin hydrochloride, with a mixture of orthophosphoric acid and sodium pyrophosphate at a temperature between about 100 and 200 degrees C., followed by certain recovery and purification procedures. When working with very small quantities of thiamin salts, for example, 0.5 gram, reasonably satisfactory results are obtained and the reaction can be carried out without undue difficulties although said known process has other serious disadvantages among which may be mentioned the difficulty of separating the desired co-carboxylase from the soluble phosphates in the reaction mixture, a procedure involving multiple crystallizations from solvents which is not only cumbersome but causes loss in activity of the co-carboxylase.

The preparation of co-carboxylase and similar products in good yields and by satisfactory procedures presents serious problems. In the first place, the water content of the reaction mixture must be reduced to a minimum since the co-carboxylase is hydrolyzed by water. In the second place, solutions containing high concentrations of phosphorus pentoxide are exceedingly viscous and the satisfactory incorporation or admixture therewith of the thiamin salt is difficult even at elevated temperatures. Due, in part at least, to the high viscosity of the reaction mixture, the latter foams extremely as a result of the liberation of hydrochloric acid from the thiamin hydrochloride during the reaction. When attempts are made to practice the previously described known process using, however, materially greater quantities of thiamin hydrochloride in the reaction, for example, of the order of 25 grams, more or less, the foaming problem becomes almost insurmountable. The enormous quantities of foam which are liberated around each particle of thiamin make it exceedingly difficult to break up individual lumps of thiamin without very vigorous stirring, and the latter is very hard to accomplish because of the viscous nature of the reaction mixture. Still further problems are met in connection with the neutralization of the reaction mixture, both thiamin and co-carboxylase being sensitive to alkalies or alkaline materials. Finally, due to the fact that co-carboxylase is very soluble, difficulties are encountered in separating the same from undesired solubles present in the reaction mixture.

In accordance with our present invention, phosphorilated esters of thiamin may be prepared in such a manner that not only are the problems previously enumerated obviated at least in large measure in the step of carrying out the phosphorilation of the thiamin but, in addition, the separation and recovery of the phosphorilated thiamin are markedly facilitated.

In general, in accordance with our invention, co-carboxylase is formed by reacting a thiamin salt, such as the phosphate or sulphate but more particularly a hydrohalide such as the hydrobromide or the hydrochloride, especially the latter, at elevated temperatures, of the order of 100-200 degrees C., and particularly at 120-140 degrees C., with phosphoric acid containing 75% to 81% of $P_2O_5$ and, particularly, substantially 80% of $P_2O_5$. The reaction proceeds smoothly and easily and produces excellent yields of co-carboxylase, namely, of the order of 90-95%, based upon the amount of thiamin hydrochloride or other thiamin salt.

The phosphoric acid containing 75% to 81% of $P_2O_5$, and particularly substantially 80% of $P_2O_5$, may be prepared in any convenient manner as, for example, by dissolving the requisite amount of $P_2O_5$ in regular commercial so-called 75% orthophosphoric acid which latter contains approximately 50% of $P_2O_5$. In certain cases, it is advantageous to dissolve the thiamin hydrochloride or other thiamin salt in commercial 75% orthophosphoric acid, a phosphoric acid containing about 80% of $P_2O_5$ being added in sufficient amount to produce the requisite content of $P_2O_5$, the water in the 75% orthophosphoric acid being changed to orthophosphoric acid. In large scale operations, this procedure is preferred since it permits better control of the reaction.

When the phosphorilating reaction is complete, which is usually in about a few minutes to about 2 hours, depending upon the size of the batch, the reaction mixture is allowed to cool to about 30-40 degrees C., and then is poured into a mixture of ice and water at such a rate that the temperature preferably does not rise appreciably above about 50 degrees C. By so proceeding, hydrolysis is substantially avoided and the final product comprises co-carboxylase. On the other hand, if cooling is omitted, the temperature, on the addition of water, may rise as high as about 140 degrees C. and the final product comprises the monophosphoric acid ester of thiamin as distinguished from the co-carboxylase. It will be seen, therefore, that, by this very simple procedure, the process can be carried out to produce either of the aforesaid phosphorilated thiamin products, depending upon which is desired. The recovery and purification steps may then be effected in various ways, as, by way of illustration, described in the following illustrative examples.

In order to achieve the full advantages of the invention, for each mol of thiamin hydrochloride or other salt used in the reaction, there should be employed at least, and preferably in some excess thereof, that amount of the phosphoric acid containing substantially 80% of $P_2O_5$ which is necessary to esterify the thiamin to produce the co-carboxylase, to take up the mol of water which is formed during the reaction and to form orthophosphoric acid therewith, to react with any water of hydration which may be present in the thiamin salt, and to replace the hydrochloric acid in case thiamin hydrochloride is utilized as one of the reactants. Good results are obtained by using of the order of equal weights of thiamin hydrochloride and 80% of $P_2O_5$ phosphoric acid but it is preferred to employ at least twice as much and particularly five to seven times as much 80% of $P_2O_5$ phosphoric acid than thiamin hydrochloride, by weight.

The following examples are illustrative of the process of the present invention. It will be understood that, within the spirit of the teachings and guiding principles disclosed herein, certain changes may be made without departing from the scope of the invention as set out in the claims.

Example 1

(a) 35 grams of thiamin hydrochloride are placed in a one-liter round-bottom flask, equipped with an agitator, and 250 grams of 80% $P_2O_5$ phosphoric acid previously heated to 100–140 degrees C. are slowly added, while stirring, over a period of about 15 minutes. The reaction mixture is then allowed to cool to about 30–40 degrees C. and is slowly poured in 500 grams of crushed ice containing just enough water to permit agitation. The reaction mixture contains the desired co-carboxylase, orthophosphoric acid, and water. During the reaction, almost all of the hydrochloric acid present in the thiamin hydrochloride is driven off as a gas. Any residual hydrochloric acid may be removed by subjecting the reaction mixture to a vacuum, preferably immediately after the completion of the reaction. To remove the orthophosphoric acid, a slurry of calcium carbonate is added in small successive amounts until a pH of about 4 to about 5.5 is reached. The mass is then filtered, washed, if desired, with about 200 cc. of hot water to remove adhering liquid, and the filtrate and washings are evaporated, preferably in vacuo, to a volume of about 60 cc. Any additional precipitate which forms is removed by filtration. To the filtrate there is then added 250 cc. of a mixture of ethyl ether and ethyl alcohol in the ratio of two parts of the ether to one part of the alcohol, by volume. The solution is cooled to about 5 degrees C. whereupon the co-carboxylase, in the form of crystals, separates out and is recovered by filtration.

(b) In order to obtain the co-carboxylase in its usual form, namely, as the hydrochloric acid salt, the crystals are dissolved in a small quantity of water and reprecipitated with the ether-alcohol mixture containing dissolved hydrochloric acid.

(c) If it is desired to obtain the monophosphoric acid ester of thiamin instead of the co-carboxylase, an equal volume of water is added to the reaction mixture after the same has cooled to about 30 degrees C. instead of adding said cooled reaction mixture to crushed ice as described in part (a) hereof. Thereafter, the reaction mixture may be treated as described in part (a) hereof to recover the monophosphoric acid ester of thiamin and the latter may be converted into its hydrochloric acid salt in the manner described in part (b) hereof.

Example 2

(a) 35 grams of thiamin hydrochloride are placed in a one-liter round-bottom flask, equipped with an agitator, 20 grams of 75% orthophosphoric acid are added, and the mixture is heated, with stirring, at about 100 degrees C. until the thiamin hydrochloride is dissolved. Thereupon, 420 grams of phosphoric acid containing 80% $P_2O_5$, which has previously been heated to 100–140 degrees C., are slowly added, with stirring, over a period of about 15 minutes. The reaction mixture is then allowed to cool to about 30–40 degrees C. and is then treated in the manner described in Example 1, including parts (b) and (c).

As indicated in the above examples, the reaction product is treated with a slurry of calcium carbonate. Powdered calcium carbonate may be employed but it is preferred to use an aqueous slurry in order to avoid the occurrence of lumping. Since the reaction which occurs upon the addition of the calcium carbonate is relatively slow and evolves little heat, it is usually not necessary to cool the reaction mixture during the addition of the calcium carbonate. In place of calcium carbonate, compounds of other alkaline earth metals which form insoluble phosphates may be utilized. Furthermore, hydrated lime may be employed but, in such case, it is generally advisable to agitate and cool the reaction mixture during the addition of the hydrated lime.

After the addition of the calcium carbonate slurry, instead of proceeding in the manner described in the foregoing examples, the entire reaction mixture may, if desired, be dried, as, for example, in a vacuum shelf drier. Where the presence of calcium phosphate is not objectionable, the resulting dried product may be used as such, or the calcium phosphate may be separated therefrom and the phosphorilated thiamin recovered.

What we claim as new and desire to protect by Letters Patent of the United States is:

1. The process which comprises reacting a thiamin salt with an excess of phosphoric acid containing from about 75% to about 81% of $P_2O_5$ at a temperature of about 100 to about 200 degrees C., cooling the reaction mixture to about 30–40 degrees C., adding the same to crushed ice, adding a member selected from the group consisting of hydrated lime and calcium carbonate until the reaction mixture has a pH of about 4 to about 5.5, filtering, evaporating the filtrate to a low volume, removing any precipitate which forms, adding a mixture of ethyl alcohol and ethyl ether, and recovering the phosphorilated thiamin in the form of crystals.

2. The process which comprises reacting a thiamin salt with an excess of phosphoric acid containing substantially 80% of $P_2O_5$ at a temperature of about 120 to about 140 degrees C., cooling the reaction mixture to about 30-40 degrees C., adding the same to crushed ice, and adding an aqueous slurry of calcium carbonate until the reaction mixture has a pH of about 4 to about 5.5.

3. The process which comprises reacting a thiamin salt with an excess of phosphoric acid containing substantially 80% of $P_2O_5$ at a temperature of about 120 to about 140 degrees C., cooling the reaction mixture to about 30-40 degrees C., adding the same to crushed ice, removing any residual hydrochloric acid under vacuum, adding an aqueous slurry of calcium carbonate until the reaction mixture has a pH of about 4 to about 5.5, filtering, evaporating the filtrate to a low volume, removing any precipitate which forms, adding a mixture of ethyl alcohol and ethyl ether, and recovering the phosphorilated thiamin in the form of crystals.

4. The process which comprises dissolving a thiamin salt in an orthophosphoric acid containing approximately 50% of $P_2O_5$, adding a phosphoric acid product thereto containing not substantially less than 80% of $P_2O_5$ in amount sufficient to convert the water present in said first-mentioned orthophosphoric acid to orthophosphoric acid, and reacting the resulting mixture at a temperature within the range of about 100 to about 200 degrees C.

5. The process which comprises dissolving a thiamin salt in an orthophosphoric acid containing approximately 50% of $P_2O_5$, adding a phosphoric acid thereto containing approximately 80% of $P_2O_5$ in amount sufficient to convert the water present in said first-mentioned orthophosphoric acid to orthophosphoric acid, reacting the resulting mixture at about 120 to about 140 degrees C., cooling the reaction mixture to about 30-40 degrees C., adding the same to crushed ice, and adding an aqueous slurry of calcium carbonate until the reaction mixture has a pH of about 4 to about 5.5.

6. The process which comprises dissolving a thiamin salt in an orthophosphoric acid containing approximately 50% of $P_2O_5$, adding a phosphoric acid thereto containing approximately 80% of $P_2O_5$ in amount sufficient to convert the water present in said first-mentioned orthophosphoric acid to orthophosphoric acid, reacting the resulting mixture at about 100 to about 200 degrees C., cooling the reaction mixture to about 30-40 degrees C., adding the same to crushed ice, adding a compound of an alkaline earth metal which forms an insoluble phosphate until the reaction mixture has a pH of about 4 to about 5.5.

7. The process which comprises dissolving a thiamin salt in an orthophosphoric acid containing approximately 50% of $P_2O_5$, adding a phosphoric acid thereto containing approximately 80% of $P_2O_5$ in amount sufficient to convert the water present in said first-mentioned orthophosphoric acid to orthophosphoric acid, reacting the resulting mixture at about 100 to about 200 degrees C., cooling the reaction mixture to about 30-40 degrees C., adding the same to crushed ice, removing any residual hydrochloric acid under vacuum, adding an aqueous slurry of calcium carbonate until the reaction mixture has a pH of about 4 to about 5.5, filtering, evaporating the filtrate to a low volume, removing any precipitate which forms, adding a mixture of ethyl alcohol and ethyl ether, and recovering the phosphorilated thiamin in the form of crystals.

8. The process which comprises dissolving thiamin hydrochloride in an orthophosphoric acid containing approximately 50% of $P_2O_5$, adding a phosphoric acid thereto containing approximately 80% of $P_2O_5$ in amount sufficient to convert the water present in said first-mentioned orthophosphoric acid to orthophosphoric acid, reacting the resulting mixture at about 120 to about 140 degrees C., cooling the reaction mixture to about 30-40 degrees C., adding the same to crushed ice, removing any residual hydrochloric acid under vacuum, adding an aqueous slurry of calcium carbonate until the reaction mixture has a pH of about 4 to about 5.5, filtering, evaporating the filtrate to a low volume, removing any precipitate which forms, adding a mixture of ethyl alcohol and ethyl ether, and recovering the phosphorilated thiamin in the form of crystals.

BEN MAIZEL.
IRVING GERSON.

REFERENCES CITED

The following references are of record in the file of this patent:

UNITED STATES PATENTS

| Number | Name | Date |
|---|---|---|
| 2,188,323 | Tauber | Jan. 23, 1940 |

OTHER REFERENCES

Jour. of the Amer. Chem. Soc., vol. 64 (1942), pages 2279-2282.

Jour. of the Amer. Chem. Soc., vol. 60 (1938), pages 2263-2264.